UNITED STATES PATENT OFFICE.

WILLIAM M. KENNEDY, OF PITTSBURG, PENNSYLVANIA.

IMPROVEMENT IN PROCESSES OF MOISTENING GRAIN PREPARATORY TO GRINDING.

Specification forming part of Letters Patent No. 159,100, dated January 26, 1875; application filed October 17, 1874.

*To all whom it may concern:*

Be it known that I, WILLIAM M. KENNEDY, of Pittsburg, in the county of Allegheny and State of Pennsylvania, have invented a new and useful Improvement in Method of Moistening or Dampening Cereals; and I do hereby declare the following to be a full, clear, and exact description thereof.

My invention relates to a method or process of dampening cereals previous to grinding, and for other purposes; and consists in subjecting the grain while in motion to the action of steam and air currents, simultaneously applied, whereby the steam is condensed upon the grain without unduly heating the same, and the grain is regularly and evenly coated with a film of moisture.

Wheat and other cereals, especially the spring wheats, often have hard dry coverings or hulls, arising from various causes, such as great heat at the time of harvesting, and evaporation taking place after long storage. Owing to this dryness of the hull, in grinding the wheat, instead of the hull being broken in scales, it is as finely ground as the flour, so that it is impossible to remove it by any of the ordinary methods of bolting. To overcome this it has been the practice to moisten the wheat by the application of spray or liquid in fine particles or minute division, and in other ways; but, as a general thing, these methods have failed, for the reason that the grains were not evenly coated with the film of water, some portions being more moist, or the water settling to some portions of the mass rendered it damper than was required, to the injury of the wheat in the milling.

The object of my invention is to overcome these difficulties, in doing which I proceed as follows:

The wheat is treated while in motion by a jet of steam and air-currents. The steam, being condensed by the air-currents, will not cook or injure the wheat, but will deposit upon the outer surface in a regular even film.

In carrying out my invention I prefer to use the following instrumentalities:

A steam-jet, supplied with a suitable valve, is introduced into the wind-spout at a short distance above the hopper, leading to the burrs generally through the valve or air-inlet, and by this means a regulated current of steam is allowed to escape into the body of wheat descending the wind-spout.

The amount of steam may be regulated by opening or closing the valve, and the jet of air may be drawn up by the fan at the upper portion of the wind-spout.

The steam and air passing up through the loose body of grain descending, the air will cause the steam to condense upon the particles, and their movement downward while the air-current and steam are passing upward causes the film to be evenly spread throughout the wheat.

It is desirable that the wind-spout should be vertical, though not absolutely necessary, for the reason that the grain in its descent will not pack, as would be the case were the spout inclined.

The condition of the grain may at any time be tested through a small opening placed below the air and steam inlet, and if the grain be found too moist, or not sufficiently moist, this can at once be corrected by the admission of more or less steam.

The essentials of my invention are simply the admission of steam in such a manner that it may permeate the moving mass of grain, together with air-currents for condensing the steam upon the wheat or other cereal, so as to prevent the liability of any injury to the grain from the temperature of the steam, and at the same time obtain its disseminating and moistening properties.

I have described the steam and air currents as introduced into the wind-spout; but it is evident that they may be introduced at any other point in the mass of moving grain and accomplish the same object.

Having thus described my invention, what I claim, and desire to secure by Letters Patent, is—

As an improvement in the method of dampening or moistening cereals, subjecting them while in motion to the simultaneous action of separate and independent steam and air currents, so as to condense the steam upon the grain, substantially as specified.

In testimony whereof I, the said WILLIAM M. KENNEDY, have hereunto set my hand.

WILLIAM M. KENNEDY.

Witnesses:
 T. B. KERR,
 F. W. RITTER, Jr.